United States Patent
Ikeda

(10) Patent No.: US 9,661,217 B2
(45) Date of Patent: May 23, 2017

(54) IMAGE CAPTURING APPARATUS AND CONTROL METHOD THEREFOR

(71) Applicant: CANON KABUSHIKI KAISHA, Tokyo (JP)

(72) Inventor: Hitoshi Ikeda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/844,895

(22) Filed: Sep. 3, 2015

(65) Prior Publication Data

US 2016/0073018 A1 Mar. 10, 2016

(30) Foreign Application Priority Data

Sep. 8, 2014 (JP) .................. 2014-182501

(51) Int. Cl.
*H04N 5/232* (2006.01)
*H04N 5/262* (2006.01)
*H04N 5/77* (2006.01)
*H04N 5/783* (2006.01)
*H04N 9/804* (2006.01)

(52) U.S. Cl.
CPC ..... *H04N 5/23229* (2013.01); *H04N 5/23222* (2013.01); *H04N 5/23293* (2013.01); *H04N 5/2621* (2013.01); *H04N 5/772* (2013.01); *H04N 5/783* (2013.01); *H04N 9/8042* (2013.01)

(58) Field of Classification Search
CPC ........... H04N 5/23229; H04N 5/23293; H04N 5/23222; H04N 5/265; H04N 5/2621; H04N 5/772; H04N 5/783; H04N 5/2354; H04N 5/57; H04N 9/8042; H04N 1/40087; G06T 11/001

USPC .......................................... 348/239
See application file for complete search history.

(56) References Cited

U.S. PATENT DOCUMENTS

| 7,990,385 B2* | 8/2011 | Kake | G06T 3/0093 345/419 |
|---|---|---|---|
| 8,139,121 B2* | 3/2012 | Ito | H04N 5/23245 348/155 |
| 8,346,066 B2* | 1/2013 | Mizuno | H04N 5/21 386/343 |
| 2004/0130637 A1* | 7/2004 | Kake | G06T 3/0093 348/239 |
| 2006/0007327 A1* | 1/2006 | Nakamura | H04N 5/2621 348/239 |
| 2006/0061672 A1* | 3/2006 | Nitta | H04N 5/772 348/239 |
| 2008/0186399 A1* | 8/2008 | Okamoto | H04N 5/232 348/372 |

(Continued)

FOREIGN PATENT DOCUMENTS

JP 2006-340070 A 12/2006

*Primary Examiner* — Pritham Prabhakher
(74) *Attorney, Agent, or Firm* — Cowan, Liebowitz & Latman, P.C.

(57) ABSTRACT

There is provided an image capturing apparatus. An image capturing unit captures a moving image. A first generating unit generates a moving image for display by adding a first special effect to the moving image. A second generating unit generates a moving image for recording by adding the first special effect and a second special effect to the moving image. A display unit displays the moving image for display while the moving image is being captured. A recording unit records the moving image for recording.

5 Claims, 7 Drawing Sheets

(56) References Cited

U.S. PATENT DOCUMENTS

| | | | | |
|---|---|---|---|---|
| 2010/0092151 A1* | 4/2010 | Miyakoshi | ............ | H04N 5/145 386/343 |
| 2012/0120278 A1* | 5/2012 | Kunishige | ............ | H04N 5/2621 348/223.1 |
| 2012/0189263 A1* | 7/2012 | Kato | ................ | H04N 5/23245 386/227 |
| 2012/0189287 A1* | 7/2012 | Otani | ................ | H04N 5/772 386/343 |
| 2013/0083211 A1* | 4/2013 | Kunishige | ............ | H04N 5/2621 348/220.1 |
| 2014/0071307 A1* | 3/2014 | Kunishige | ............ | H04N 1/212 348/220.1 |
| 2014/0086550 A1* | 3/2014 | Matsui | ................ | H04N 5/76 386/230 |
| 2014/0186006 A1* | 7/2014 | Jin | ................ | H04N 5/783 386/230 |

* cited by examiner

IMAGE CAPTURING APPARATUS AND CONTROL METHOD THEREFOR

BACKGROUND OF THE INVENTION

Field of the Invention

The present invention relates to an image capturing apparatus and a control method therefor.

Description of the Related Art

Some image capturing apparatuses such as digital cameras have functions for shooting still images to which special effects are added through image processing, such as a fisheye lens effect, a tilt-shift effect that blurs the top and bottom of an image, a soft-focus effect that slightly defocuses an image, and so on. An image capturing apparatus having a function for shooting moving images to which such special effects are added through image processing has also been proposed (Japanese Patent Laid-Open No. 2006-340070).

A conventional technique that, by shooting a moving image at a different framerate than the framerate used during playback, generates the moving image to be played back in fast-forward or slow-motion is also known. When shooting a moving image to be generated in fast-forward or slow-motion during playback, the moving image is shot at a different framerate than the framerate used when playing the moving image back; as such, a moving subject will appear differently in the played-back moving image and the moving image displayed in live view during shooting.

As mentioned above, in the case where a special effect is added through image processing when recording a moving image to be generated in fast-forward or slow-motion during playback, the played-back moving image and the moving image displayed in live view during shooting will appear differently. Accordingly, depending on the type of special effect, adding the same special effect to the moving image displayed in live view as the special effect added to the recorded moving image may cause a user viewing the live view display to experience a sense of discomfort.

Meanwhile, a moving image displayed in live view also serves as an electronic viewfinder image for shooting moving images. Thus depending on the type of special effect, it may be inappropriate to add the same special effect to the moving image displayed in live view as the special effect added to the recorded moving image regardless of whether or not the moving image is to be played back in fast-forward, slow-motion, or the like.

SUMMARY OF THE INVENTION

Having been achieved in light of such a situation, the present invention provides a technique for restricting special effects added to moving images for display to a part of a plurality of special effects added to moving images for recording.

According to a first aspect of the present invention, there is provided an image capturing apparatus comprising: an image capturing unit configured to capture a moving image; a first generating unit configured to generate a moving image for display by adding a first special effect to the moving image; a second generating unit configured to generate a moving image for recording by adding the first special effect and a second special effect to the moving image; a display unit configured to display the moving image for display while the moving image is being captured; and a recording unit configured to record the moving image for recording.

According to a second aspect of the present invention, there is provided a control method for an image capturing apparatus, the method comprising: an image capturing step of capturing a moving image; a first generating step of generating a moving image for display by adding a first special effect to the moving image; a second generating step of generating a moving image for recording by adding the first special effect and a second special effect to the moving image; a display step of displaying the moving image for display while the moving image is being captured; and a recording step of recording the moving image for recording.

According to a third aspect of the present invention, there is provided a non-transitory computer-readable storage medium which stores a program for causing a computer to execute a method comprising: an image capturing step of capturing a moving image; a first generating step of generating a moving image for display by adding a first special effect to the moving image; a second generating step of generating a moving image for recording by adding the first special effect and a second special effect to the moving image; a display step of displaying the moving image for display while the moving image is being captured; and a recording step of recording the moving image for recording.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
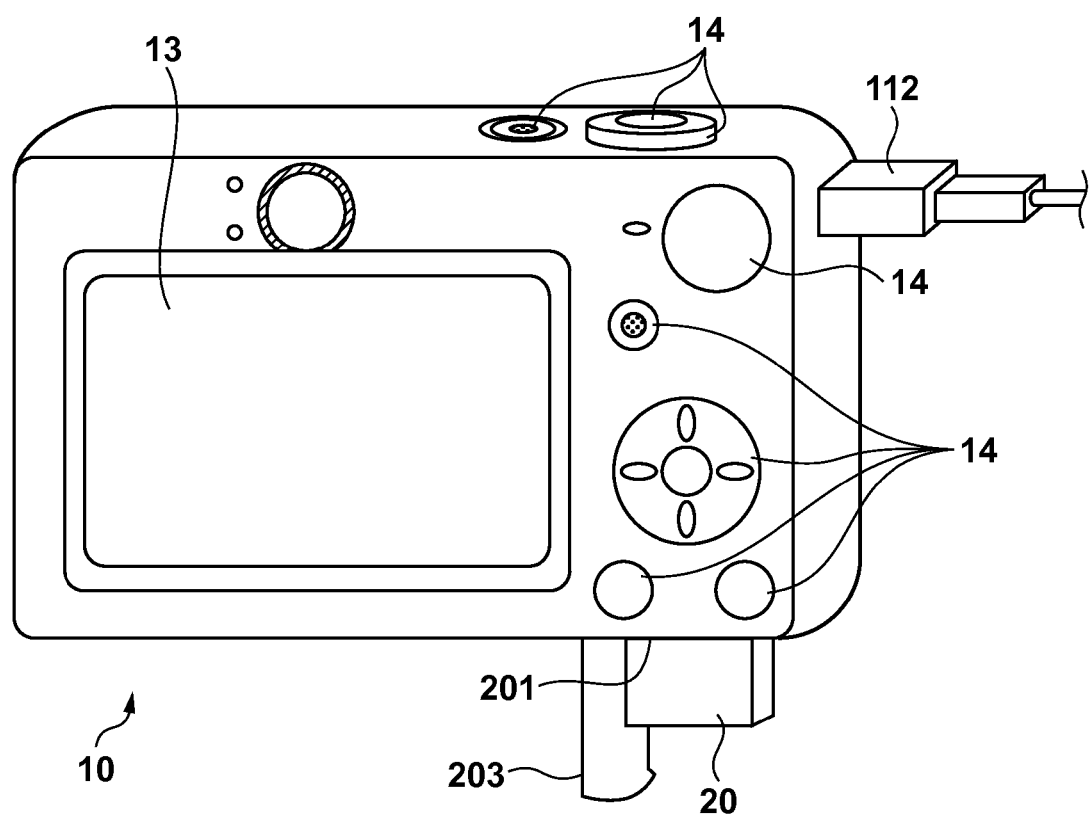
FIG. 1 is an external view of an image capturing apparatus 10.
Figure 2:
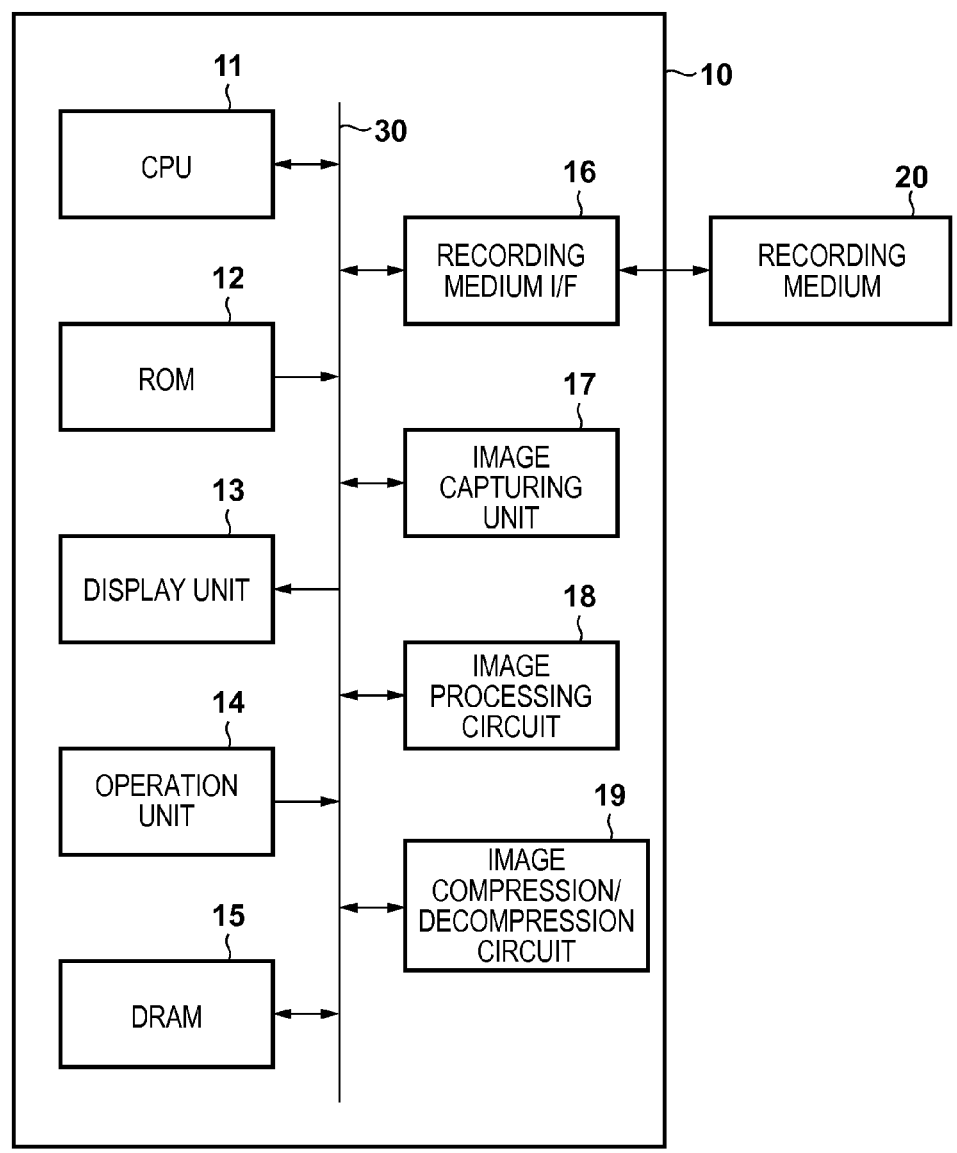
FIG. 2 is a functional block diagram of the image capturing apparatus 10.

FIG. 1 is an external view of an image capturing apparatus 10 according to a first embodiment, and FIG. 2 is a functional block diagram of the image capturing apparatus 10. A connector 112 connects a connection cable and the image capturing apparatus 10. A recording medium 20 is a recording medium capable of random access, such as a memory card, an optical disk, a hard disk, or the like, and can be mounted in and removed from the image capturing apparatus 10. A recording medium slot 201 is a slot for holding the recording medium 20. The recording medium 20 held in the recording medium slot 201 can communicate with the image capturing apparatus 10. A cover 203 is a cover for the recording medium slot 201.

A CPU (central processing unit) 11 controls the respective functional blocks of the image capturing apparatus 10, controls the flow of data among the functional blocks, and so on. Programs (firmware) for processing performed by the CPU 11, various types of information, and so on are stored in a ROM 12.

A display unit 13 is constituted by a color liquid-crystal display device or the like, and is used to display images, a graphical user interface, and so on. The display unit 13 also includes a terminal that outputs image signals to an external display apparatus such as a TV or the like.

An operation unit 14 is constituted by various types of buttons such as a release button and a moving image recording start button, a directional key, a control wheel, a dial switch, and so on that accept instructions from a user.

A DRAM 15 is used as a work area of the CPU 11, and has a buffering function for temporarily storing image data, display data, compressed image data, and so on. Although the writing and reading of data to and from the DRAM 15 is normally carried out via a memory controller, the memory controller is not illustrated here. In addition, although not illustrated here, a DMA controller is provided between the respective functional blocks and the DRAM 15 for DMA transfers not involving reads and writes performed by the CPU 11.

A recording medium interface (I/F) 16 writes and reads out image data into and from the recording medium 20 in response to instructions from the CPU 11. The CPU 11, the DRAM 15, and the recording medium I/F 16 function as a recording unit that records still images and moving images, which are shot images, into the recording medium 20.

An image capturing unit 17 is constituted of a lens, a diaphragm, a shutter, and an image sensor such as a CCD sensor, a CMOS sensor, or the like.

An image processing circuit 18 converts image data read out from the image capturing unit 17 into YUV data by carrying out processes such as white balance adjustment, pixel interpolation, and so on on the image data. The image processing circuit 18 also resizes the image data to a desired size, and generates display image data for display in the display unit 13, compression image data to be compressed by an image compression/decompression circuit 19, and so on. The image processing circuit 18 also carries out special effect processing such as color/tone filtering, template image synthesis, and recursive filtering for adding a color/tone conversion effect, a peripheral brightness increase/decrease effect, an afterimage effect, and so on to the image data.

The image compression/decompression circuit 19 compresses the YUV data into image data in the JPEG or H.264 format or decompresses image data compressed in the JPEG or H.264 format into YUV data.

The CPU 11, the ROM 12, the display unit 13, the operation unit 14, the DRAM 15, the recording medium I/F 16, the image capturing unit 17, the image processing circuit 18, and the image compression/decompression circuit 19 communicate via an internal bus 30.

Next, a moving image shooting process according to the present embodiment will be described. The image capturing apparatus 10 can shoot a moving image and record the moving image having added a special effect such as the color/tone conversion effect, the peripheral brightness increase/decrease effect, and the afterimage effect thereto. The color/tone conversion effect is an effect achieved through a process for converting at least one of the color and the tone of the moving image. The peripheral brightness increase/decrease effect is an effect achieved through a process for changing peripheral brightness in the moving image. The afterimage effect is an effect achieved through a process for adding an afterimage to a moving subject in the moving image.

The image capturing apparatus 10 can also set a framerate used when shooting the moving image (a shooting framerate) to a value different from the framerate of a moving image file, or in other words, different from a framerate used when playing back the moving image (a playback framerate). Furthermore, the image capturing apparatus 10 can control a frame recording ratio (a ratio of the number of recorded frames to the number of frames in the shot moving image). By controlling the shooting framerate and the recording ratio, a moving image can be recorded so that a predetermined portion (all or part) thereof is played back in fast-forward or slow-motion.

As will be described in detail hereinafter, of the stated special effects, the image capturing apparatus 10 adds the color/tone conversion effect and the peripheral brightness increase/decrease effect to both a moving image for display and a moving image for recording. This is because the color/tone conversion effect and the peripheral brightness increase/decrease effect are thought to appear the same in both a moving image displayed in live view and a moving image played back after recording. On the other hand, of the stated special effects, the image capturing apparatus 10 adds the afterimage effect only to the moving image for recording, and not to the moving image for display. This is because it is thought that in the case where a moving image to be played back in fast-forward or in slow-motion is recorded, the afterimage effect will appear differently in the moving image displayed in live view and the moving image played back after recording.

Figure 3A:
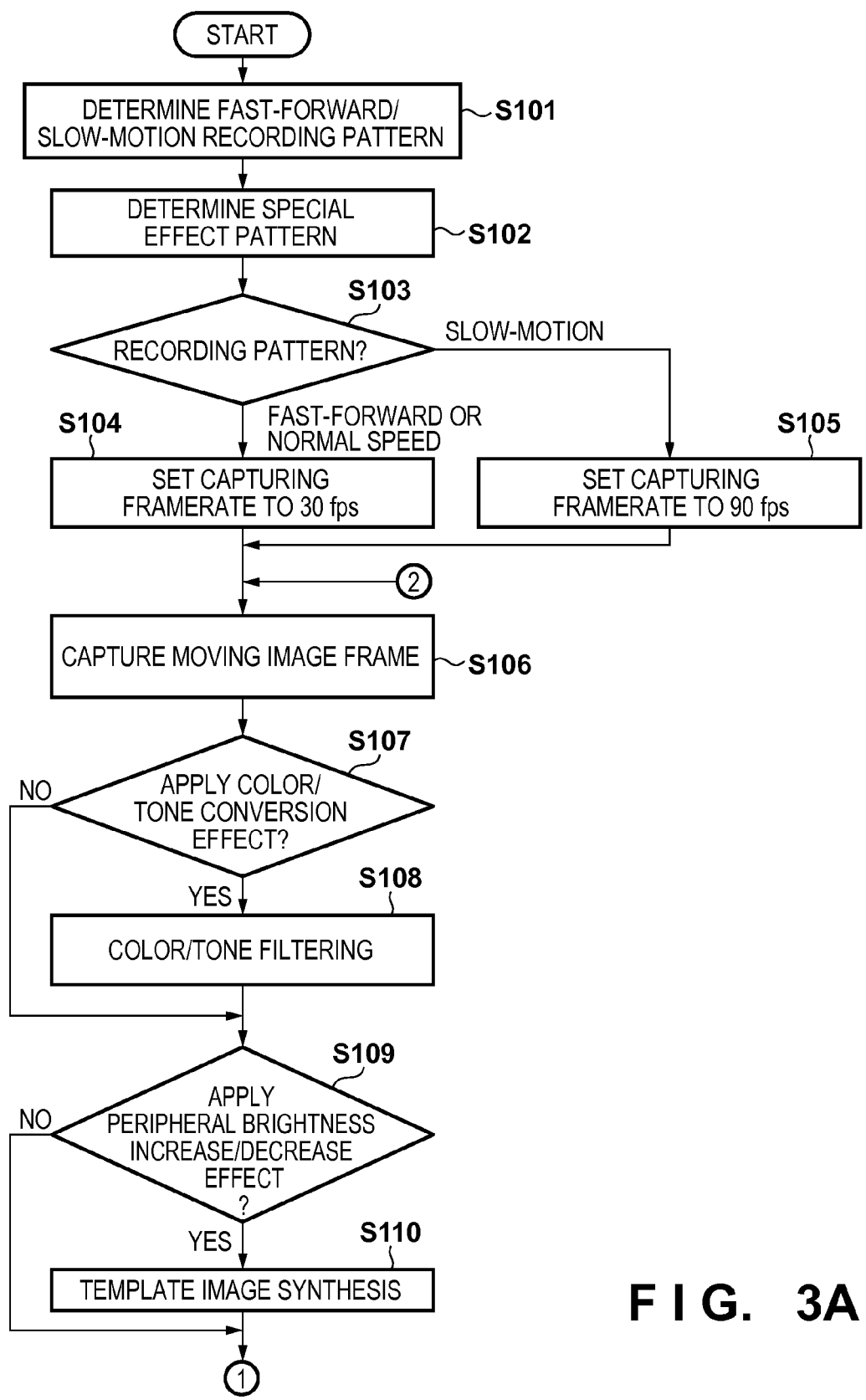
FIGS. 3A and 3B are flowcharts of a moving image shooting process performed by the image capturing apparatus 10 according to a first embodiment.
Figure 3B:
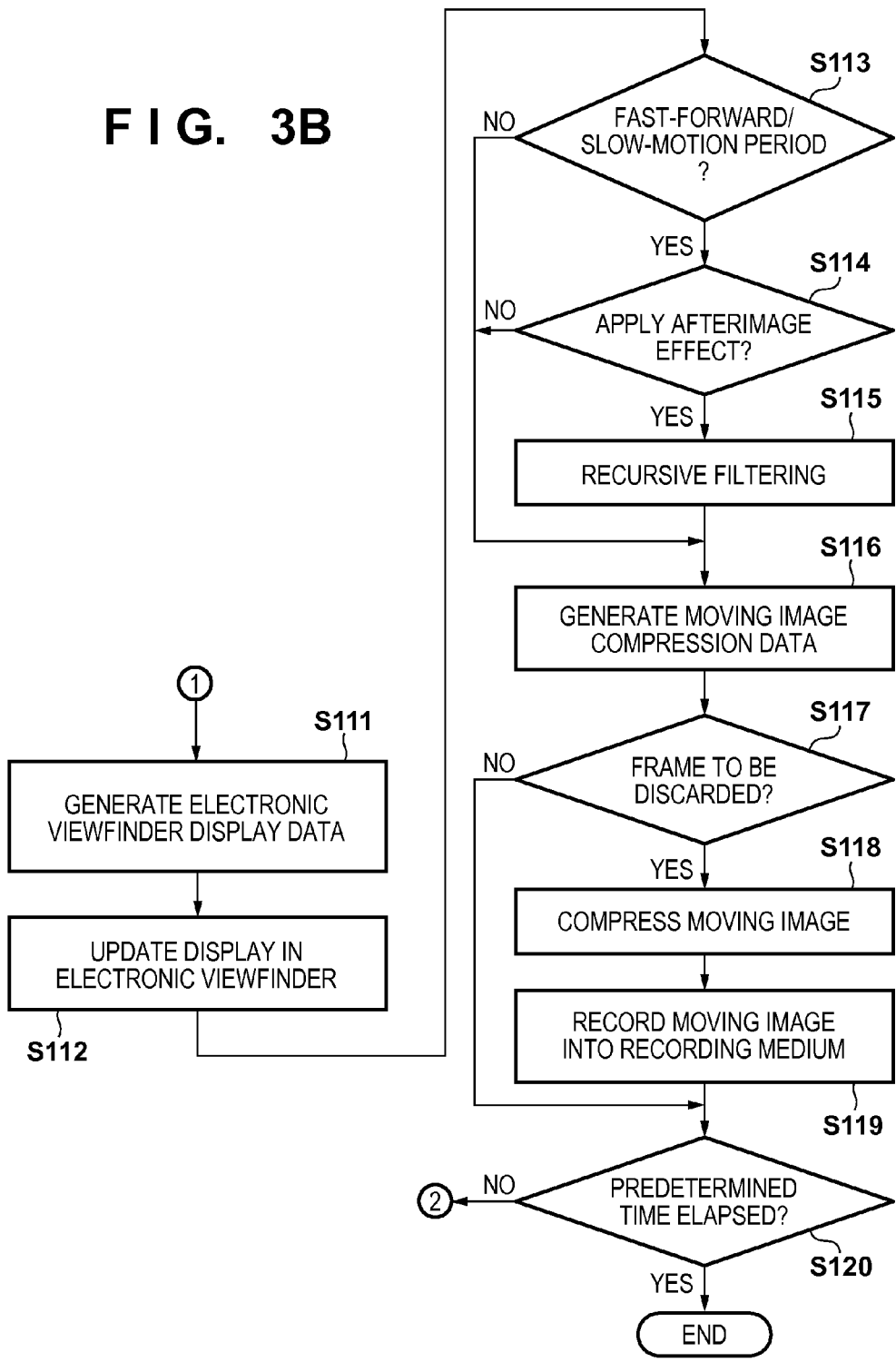

FIGS. 3A and 3B are flowcharts of a moving image shooting process performed by the image capturing apparatus 10 according to the first embodiment. Unless otherwise specified, the processes in the respective steps of this flowchart are realized by the CPU 11 executing programs stored in the ROM 12. The processing of this flowchart starts when a user instructs the recording of a moving image to start by manipulating the moving image recording start button of the operation unit 14.

In step S101, the CPU 11 determines a recording pattern, such as whether to set the recorded moving image to normal speed, fast-forward, slow-motion, or the like, and whether to apply fast-forward, slow-motion, or the like to the entire moving image or to only part of the moving image, and stores the recording pattern in the DRAM 15. The recording pattern is determined automatically by the image capturing apparatus 10 from information indicating motion in the image capturing apparatus 10 or a subject, whether or not the subject is a person, a brightness and color of a subject field, and so on, for example. The image capturing apparatus 10 may instead be configured so that the user can select the recording pattern using a settings menu or the like prior to the start of recording. Examples of the recording pattern will be described with reference to FIGS. 4A to 4E. The playback framerate is assumed to be 30 fps in all of the patterns indicated in FIGS. 4A to 4E.

Figure 4A:
FIGS. 4A through 4E are diagrams illustrating moving image recording patterns.
Figure 4B:
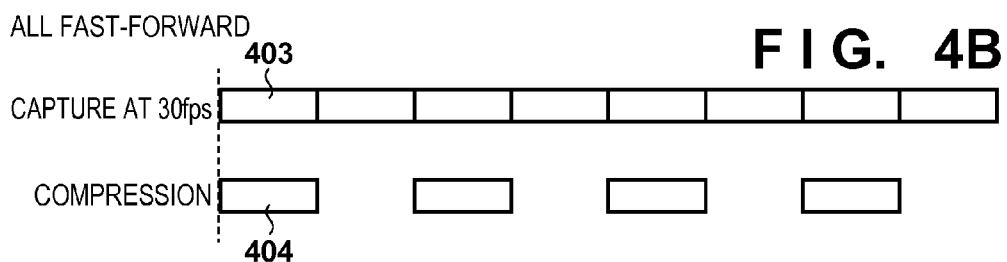
Figure 4C:
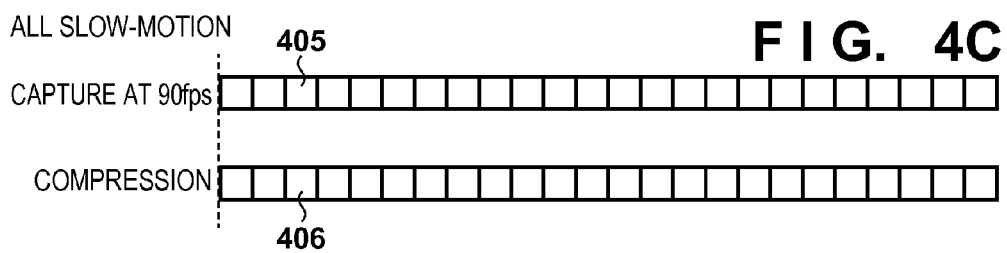
Figure 4D:
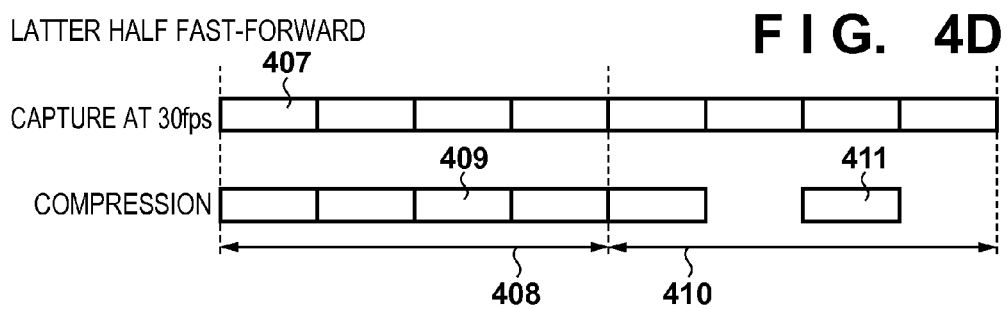
Figure 4E:
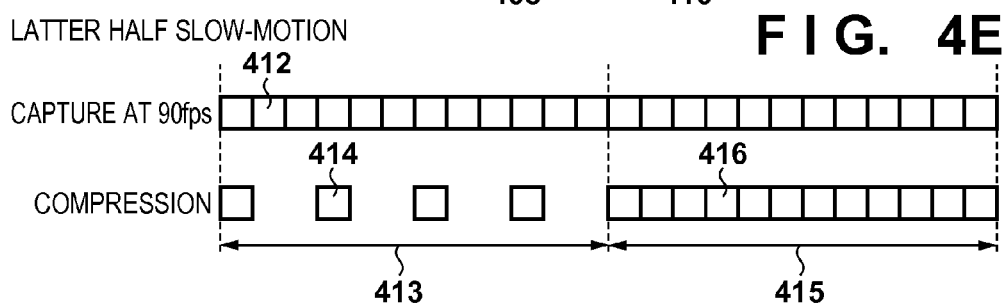

FIG. 4A illustrates the entire moving image recorded at normal speed. In this case, the image capturing apparatus 10 sets a capturing framerate (the shooting framerate) of the image capturing unit 17 to 30 fps, and uses all of captured frames 401 as compression frames 402. FIG. 4B illustrates the entire moving image recorded in fast-forward. In this case, the image capturing apparatus 10 sets the capturing framerate of the image capturing unit 17 to 30 fps, thins captured frames 403 to ½, and uses the remaining frames as compression frames 404. FIG. 4C illustrates the entire moving image recorded in slow-motion. In this case, the image capturing apparatus 10 sets the capturing framerate of the image capturing unit 17 to 90 fps, and uses all of captured frames 405 as compression frames 406. FIG. 4D illustrates a latter half of the moving image recorded in fast-forward. In this case, the image capturing apparatus 10 sets the capturing framerate of the image capturing unit 17 to a constant 30 fps when recording the moving image. Then, in a normal speed period 408, the image capturing apparatus 10 uses all of captured frames 407 as compression frames 409, and in a fast-forward period 410, the image capturing apparatus 10 thins the captured frames 407 to ½ and uses the remaining frames as compression frames 411. FIG. 4E illustrates a latter half of the moving image recorded in slow-motion. In this case, the image capturing apparatus 10 sets the capturing framerate of the image capturing unit 17 to a constant 90 fps when recording the moving image. Then, in a normal speed period 413, the image capturing apparatus 10 thins captured frames 412 to ⅓ and uses the remaining frames as compression frames 414, and in a slow-motion period 415, the image capturing apparatus 10 uses all of the captured frames 412 as compression frames 416. As such, by controlling the shooting framerate and the extent of the thinning (that is, the frame recording ratio), the image capturing apparatus 10 can record the moving image so that a predetermined portion (all or part) thereof is played back in fast-forward or slow-motion.

Returning to FIG. 3A, in step S102, the CPU 11 determines a special effect pattern to be added to the moving image to be recorded, and stores the pattern in the DRAM 15. Specifically, the CPU 11 determines whether or not to apply the color/tone conversion effect and whether or not to apply the peripheral brightness increase/decrease effect. Meanwhile, in the case where the recording pattern determined in step S101 includes fast-forward, slow-motion, or the like, the CPU 11 also determines whether or not to apply the afterimage effect. Like the recording pattern, the special effect pattern is determined automatically by the image capturing apparatus 10 from information indicating motion in the image capturing apparatus 10 or a subject, whether or not the subject is a person, a brightness and color of a subject field, and so on, for example. The image capturing apparatus 10 may instead be configured so that the user can select the special effect pattern using the settings menu or the like prior to the start of recording.

In step S103, the CPU 11 refers to the recording pattern determined in step S101 and stored in the DRAM 15, and determines whether or not the recording pattern includes only normal speed or fast-forward, or includes slow-motion. In the case where the recording pattern includes only normal speed or includes fast-forward, in step S104, the CPU 11 sets the capturing framerate of the image capturing unit 17 to the same 30 fps as the framerate used when playing back the moving image. In the case where the recording pattern includes slow-motion, in step S105, the CPU 11 sets the capturing framerate of the image capturing unit 17 to 90 fps, which is higher than the framerate used when playing back the moving image.

After the process of step S104 or step S105, in step S106, the CPU 11 captures an image formed by the image capturing unit 17 as a moving image frame. Then, using the image processing circuit 18, the CPU 11 carries out processing such as white balance adjustment and pixel interpolation on the image data of the captured moving image frame, converts that data into YUV data, and writes the YUV data into the DRAM 15.

In step S107, the CPU 11 refers to the special effect pattern determined in step S102 and stored in the DRAM 15, and determines whether or not to apply the color/tone conversion effect. In the case where the color/tone conversion effect is applied, the processing advances to step S108, whereas in the case where the color/tone conversion effect is not applied, the processing advances to step S109.

In step S108, the CPU 11 carries out the color/tone filtering on the YUV data using the image processing circuit 18, and adds the color/tone conversion effect.

In step S109, the CPU 11 refers to the special effect pattern determined in step S102 and stored in the DRAM 15, and determines whether or not to apply the peripheral brightness increase/decrease effect. The processing advances to step S110 in the case where the peripheral brightness increase/decrease effect is applied. The processing advances to step S111 in the case where the peripheral brightness increase/decrease effect is not applied.

In step S110, the CPU 11 carries out the template image synthesis on the YUV data using the image processing circuit 18, and adds the peripheral brightness increase/decrease effect.

In step S111, the CPU 11 uses the image processing circuit 18 to carry out a resizing process for resizing the YUV data to a display image data size, generate electronic viewfinder display image data for performing a live view display in the display unit 13, and write the data into the DRAM 15.

Along with the generation of the display image data, in step S112, the CPU 11 causes the display image data to be displayed in the display unit 13. In other words, the live view display image is updated in the display unit 13.

In step S113, the CPU 11 refers to the recording pattern determined in step S101 and stored in the DRAM 15, and determines whether or not the current frame is within a fast-forward period or a slow-motion period. The processing advances to step S114 in the case where the current frame is within a fast-forward period or a slow-motion period. The processing advances to step S116 in the case where the current frame is not within a fast-forward period or a slow-motion period.

In step S114, the CPU 11 refers to the special effect pattern determined in step S102 and stored in the DRAM 15, and determines whether or not to apply the afterimage effect. The processing advances to step S115 in the case where the afterimage effect is applied. The processing advances to step S116 in the case where the afterimage effect is not applied.

In step S115, the CPU 11 carries out the recursive filtering on the YUV data using the image processing circuit 18, and adds the afterimage effect.

In step S116, the CPU 11 uses the image processing circuit 18 to generate moving image compression data from the YUV data, and writes the generated data into the DRAM 15.

In step S117, the CPU 11 refers to the recording pattern determined in step S101 and stored in the DRAM 15, and determines whether or not the current frame is a frame to be discarded. The "frame to be discarded" is a frame that is shot but not recorded, as indicated in FIGS. 4B, 4D, and 4E, for example. In the case where the current frame is a frame to be discarded, the processing advances to step S120. In this case, the current frame is not recorded. In the case where the current frame is not a frame to be discarded, the processing advances to step S118.

In step S118, the CPU 11 uses the image compression/decompression circuit 19 to compress the moving image compression data generated in step S116 according to a format such as MPEG, MotionJPEG, or the like.

In step S119, the CPU 11 records the moving image data compressed in step S118 into the recording medium 20 via the recording medium I/F 16.

In step S120, the CPU 11 determines whether or not a predetermined moving image recording time has elapsed. In the case where it is determined that the predetermined moving image recording time has not elapsed, the processing returns to step S106, where the CPU 11 carries out the same processing on the next moving image frame. In the case where it is determined that the predetermined moving image recording time has elapsed, the CPU 11 ends the moving image shooting process.

Through the processing described above, of the stated special effects, the color/tone conversion effect and the peripheral brightness increase/decrease effect are added to both the moving image for display and the moving image for recording. On the other hand, of the stated special effects, the afterimage effect is added only to the moving image for recording, and not to the moving image for display. In this manner, according to the present embodiment, the special effects added to the moving image for display are restricted to a part of the plurality of special effects added to the moving image for recording.

As described earlier, it is thought that the color/tone conversion effect and the peripheral brightness increase/decrease effect appear similarly in both a moving image displayed in live view and a moving image played back after recording. Meanwhile, in the case where the moving image displayed in live view and the moving image played back after recording have different framerates, it is thought that the afterimage effect will appear differently between those two moving images. As such, according to the present embodiment, a more natural live view display that imparts little sense of unnaturalness on the user can be achieved.

However, the way of thinking about the appearance of special effects is not limited to that described above. Accordingly, the classifications of special effects to be added to both the moving image for display and the moving image for recording (first special effects) and special effects to be added only to the moving image for recording (second special effects) is not intended to be limited to that described in the present embodiment. For example, the peripheral brightness increase/decrease effect may be added only to the moving image for recording and not to the moving image for display.

In addition, the special effects added to the moving image for recording are not limited to the color/tone conversion effect, the peripheral brightness increase/decrease effect, and the afterimage effect, and the image capturing apparatus 10 may add other types of special effects to the moving image for recording.

Incidentally, according to the flowchart illustrated in FIG. 3B, the afterimage effect will only be added to the portions of the moving image for recording within the fast-forward period or the slow-motion period. However, the image capturing apparatus 10 may be configured to add the afterimage effect to portions aside from the portions within the fast-forward period or the slow-motion period. To rephrase, the image capturing apparatus 10 may add the afterimage effect to the moving image for recording regardless of whether or not the recording pattern contains fast-forward or slow-motion.

Second Embodiment

The first embodiment describes a configuration in which the playback speed of a recorded moving image is controlled through a combination of shooting framerate control and recording ratio control, as indicated in FIGS. 4A to 4E. As opposed to this, a second embodiment will describe a configuration in which the playback speed of a recorded moving image is controlled through shooting framerate control, without carrying out recording ratio control.

In the second embodiment, the basic configuration of the image capturing apparatus 10 is the same as in the first embodiment (see FIGS. 1 and 2). The following will primarily describe areas that are different from the first embodiment.

Figure 5A:
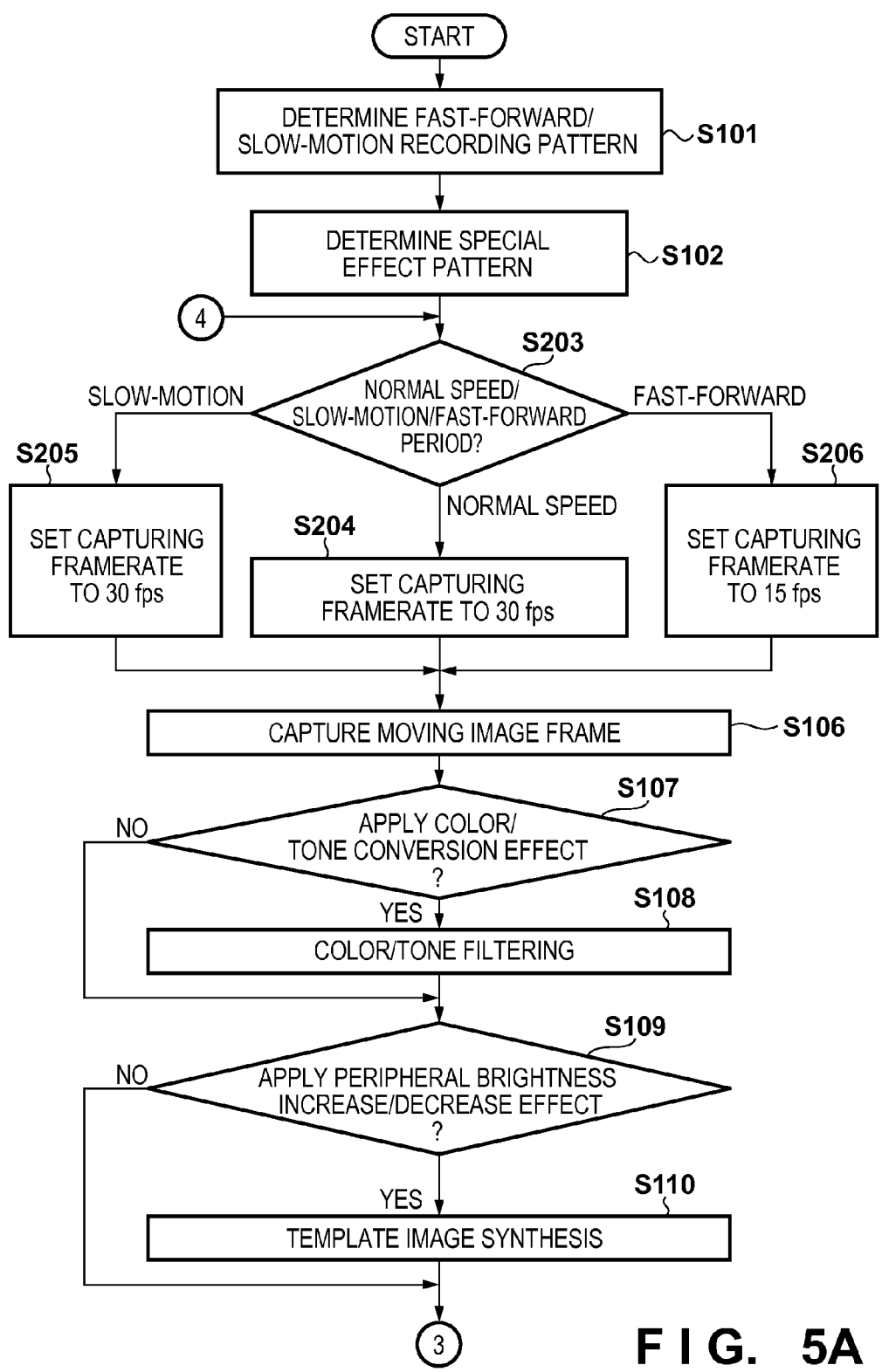
FIGS. 5A and 5B are flowcharts of a moving image shooting process performed by the image capturing apparatus 10 according to a second embodiment.
Figure 5B:
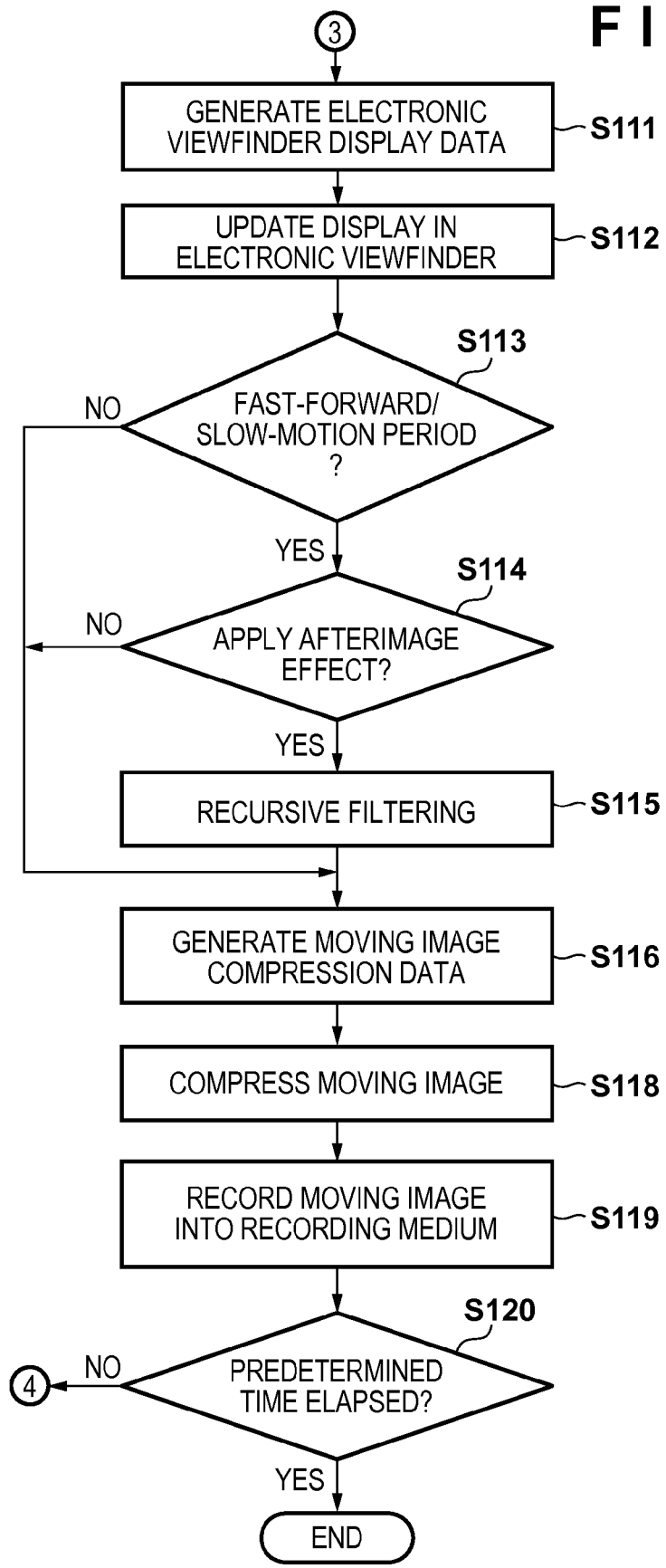

FIGS. 5A and 5B are flowcharts of a moving image shooting process performed by the image capturing apparatus 10 according to the second embodiment. In FIGS. 5A and 5B, steps that perform processes identical or similar to those in FIGS. 3A and 3B are given identical reference numerals. Unless otherwise specified, the processes in the respective steps of this flowchart are realized by the CPU 11 executing programs stored in the ROM 12. The processing of this flowchart starts when a user instructs the recording of a moving image to start by manipulating the moving image recording start button of the operation unit 14.

In step S203, the CPU 11 refers to the recording pattern determined in step S101 and stored in the DRAM 15, and determines whether the current frame is within a normal speed period, a slow-motion period, or a fast-forward period. In the case where the current frame is within the normal speed period, in step S204, the CPU 11 sets the capturing framerate of the image capturing unit 17 to the same 30 fps as the framerate used when playing back the moving image. In the case where the current frame is within the slow-motion period, in step S205, the CPU 11 sets the capturing framerate of the image capturing unit 17 to 90 fps, which is higher than the framerate used when playing back the moving image. In the case where the current frame is within the fast-forward period, in step S206, the CPU 11 sets the capturing framerate of the image capturing unit 17 to 15 fps, which is lower than the framerate used when playing back the moving image.

The processes of step S106 and on are carried out in the same manner as in the first embodiment after the processes of step S204, S205, or S206. However, unlike the first embodiment, the determination of a frame to be discarded of step S117 is not carried out. Furthermore, in the case where it is determined in step S120 that the predetermined moving image recording time has not elapsed, the processing returns to step S203 rather than step S106. Accordingly, in the second embodiment, the shooting framerate changes while shooting a moving image depending on whether the current frame is in the normal speed period, the slow-motion period, or the fast-forward period. In addition, all shot frames are recorded.

In this manner, according to the second embodiment, the image capturing apparatus 10 controls the playback speed of a recorded moving image through shooting framerate control, without carrying out recording ratio control.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182501, filed Sep. 8, 2014 which is hereby incorporated by reference herein in its entirety.

What is claimed is:

1. An image capturing apparatus comprising:
an image sensor that captures a moving image; and
a CPU that generates a first moving image by adding a first special effect to the moving image and generates a second moving image by adding a second special effect to the first moving image,
wherein the CPU generates, from the first moving image to which the second special effect is not added, a moving image for display to be displayed on a display device, and generates, from the second moving image, a moving image for recording to be recorded in a recording medium, and
wherein the second special effect, includes an effect achieved by a process for adding an afterimage to a moving subject in the first moving image,
wherein the CPU controls a capturing framerate of the image sensor, or the capturing framerate of the image sensor and a ratio of the moving image for recording to frames of the moving image that are captured by the image sensor, so that a predetermined period of the moving image for recording is played back in fast-forward or in slow-motion during playback, and
wherein the CPU generates the second moving image by adding the second special effect to a period of the first moving image corresponding to the predetermined period of the moving image for recording.

2. The image capturing apparatus according to claim 1, wherein the predetermined period is the entire moving image for recording.

3. The image capturing apparatus according to claim 1, wherein the first special effect includes at least one of an effect achieved by a process for converting at least one of a color and a tone of the moving image, and an effect achieved by a process for changing peripheral brightness of the moving image.

4. A control method for an image capturing apparatus, the method comprising:
capturing a moving image;
generating a first moving image by adding a first special effect to the moving image;
generating a second moving image by adding a second special effect to the first moving image;
generating, from the first moving image to which the second special effect is not added, a moving image for display to be displayed on a display device; and
generating, from the second moving image, a moving image for recording to be recorded in a recording medium,
wherein the second special effect includes an effect achieved by a process for adding an afterimage to a moving subject in the first moving image,
controlling a capturing framerate of the image sensor, or the capturing framerate of the image sensor and a ratio of the moving image for recording to frames of the moving image that are captured by the image sensor, so that a predetermined period of the moving image for recording is played back in fast-forward or in slow-motion during playback, and
generating the second moving image by adding the second special effect to a period of the first moving image corresponding to the predetermined period of the moving image for recording.

5. A non-transitory computer-readable storage medium which stores a program for causing a computer to execute a method comprising:
capturing a moving image;
generating a first moving image by adding a first special effect to the moving image;
generating a second moving image by adding a second special effect to the first moving image;
generating, from the first moving image to which the second special effect is not added, a moving image for display to be displayed on a display device; and
generating, from the second moving image, a moving image for recording to be recorded in a recording medium,
wherein the second special effect includes an effect, achieved by a process for adding an afterimage to a moving subject in the first moving image,
controlling a capturing framerate of the image sensor, or the capturing framerate of the image sensor and a ratio of the moving image for recording to frames of the moving image that are captured by the image sensor, so that a predetermined period of the moving image for recording is played back in fast-forward or in slow-motion during playback, and
generating the second moving image by adding the second special effect to a period of the first moving image corresponding to the predetermined period of the moving image for recording.

* * * * *